(12) United States Patent
Tsuchida (10) Patent No.: US 7,667,584 B2
(45) Date of Patent: Feb. 23, 2010

(54) TIRE ADMINISTRATION SYSTEM

(75) Inventor: Shinya Tsuchida, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 311 days.

(21) Appl. No.: 11/884,237

(22) PCT Filed: Feb. 3, 2006

(86) PCT No.: PCT/JP2006/301855

§ 371 (c)(1),
(2), (4) Date: Aug. 13, 2007

(87) PCT Pub. No.: WO2006/087924

PCT Pub. Date: Aug. 24, 2006

(65) Prior Publication Data

US 2008/0157954 A1    Jul. 3, 2008

(30) Foreign Application Priority Data

Feb. 17, 2005    (JP)    ............... 2005-040614

(51) Int. Cl.
*B60C 23/00*    (2006.01)
(52) U.S. Cl. ............... 340/445; 340/442; 340/438; 340/447
(58) Field of Classification Search ............... 340/445, 340/442, 438, 447, 443, 444, 446, 448
See application file for complete search history.

(56) References Cited

U.S. PATENT DOCUMENTS 7,209,032 B2 *    4/2007    Fennel et al. ............... 340/445

2004/0212487 A1    10/2004    Yagi et al.
2006/0220809 A1 *    10/2006    Stigall et al. ............... 340/438

FOREIGN PATENT DOCUMENTS

| EP | 1 562 162 A1 | 8/2005 |
| JP | A 10-104103 | 4/1998 |
| JP | A 2001-322411 | 11/2001 |
| JP | A 2004-9923 | 1/2004 |
| JP | A 2004-145474 | 5/2004 |
| JP | A 2004-322926 | 11/2004 |

* cited by examiner

*Primary Examiner*—Travis R Hunnings
(74) *Attorney, Agent, or Firm*—Oliff & Berridge, PLC (57) ABSTRACT

A tire administration system selects a frequency of a high reception probability, when a measured data request signal is transmitted from a receiver module (1) to a sensor module (3), or when a frequency of the data request signal is changed, so as to promptly acquire a measured data from the sensor module (3). The receiver module (1) transmits the measured data request signal to the sensor module (3), at a frequency used for a latest, successful acquisition of the measured data from a sensor module (3), transmits the measured data request signal, if the measured data cannot be acquired, repeatedly until the measured data can be acquired, and transmits, if the transmission number of the measured data request signal reaches a designated transmission number, the measured data request signal to the sensor module (3) at a frequency used for a second latest, successful acquisition of the measured data.

4 Claims, 6 Drawing Sheets

(a) | f | ID | CMD |

(b) | ID | DATA | OK/NG |

FIG. 6

TIRE ADMINISTRATION SYSTEM

TECHNICAL FIELD

The present invention relates to improvement in a tire administration system including a sensor module that is secured to an inner side of a tire mounted on a vehicle, for measuring a tire state quantity inclusive of a tire inner pressure, and a receiver module secured to a vehicle body side, for receiving the measured data transmitted from the sensor module.

BACKGROUND ART

For performing administration of tires under operation of construction vehicles or the like, there has been proposed to mount a tire administration system on a vehicle, wherein a sensor module for measuring a tire state quantity, such as an inner pressure or temperature of the tire, is secured to an inner side of the tire, the measured data from the sensor module is received by a receiver module on the vehicle body side, and the received. data is transmitted to a vehicle operation administration center where the operation of a plurality of vehicles is administered. This proposal has for its object to ensure that, if it is judged, based on the data of the tire administration system provided for each vehicle, that the vehicle is likely to cause a failure, then a necessary command is given to the driver from the vehicle operation administration center so as to avoid a dangerous situation in advance. Refer, for example, to Patent Document 1 identified below.

Such a tire administration system is configured so that the data request signal is transmitted form each receiver module to the corresponding sensor module at a predetermined period, and the sensor module measures the tire state quantity in accordance with the reception timing of the data request signal and transmits the measured data to the receiver module, thereby allowing the receiver module to acquire the measured data fro the sensor module.

Patent Document 1: Japanese Patent Application Laid-open Publication No. 10-104103

DISCLOSURE OF THE INVENTION

Task to be Solved by the Invention

In the above-mentioned tire administration system, the electric field intensity at the location of the sensor module is small due to the shielding effect of the steel belt that constitutes the tire. Moreover, at the signal reception section of the sensor module, in order to suppress exhaustion of batteries for driving the sensor module, the signal reception sensitivity is at low level. Therefore, the signal intensity of the data request signal transmitted from each receiver module to the sensor module is correspondingly increased. However, from the viewpoint of interference to other electronic appliances when the signal transmitted from a wireless device has a high intensity, some countries pose a restriction for a continuous transmission of wireless signal at an intensity above a predetermined level and at the same frequency. In such countries, there may be instances wherein the frequency of the data request signal transmitted from the receiver module to the sensor module must be periodically changed.

However, due to influences from other vehicles or disturbances, depending upon the frequency of the data request signal, the reception probability of the data request signal at the sensor module may be extremely low. In such an instance, since the data request signal cannot be received by the sensor module, it is necessary for the receiver module to transmit the data request signal while successively changing the frequency until the sensor module is able to receive the data request signal, thereby giving rise to a problem that it takes long time until the measured data is acquired from the sensor module.

The present invention has been achieved in view of such a problem. It is a primary object of the present invention to provide a tire administration system capable of selecting a frequency of a high reception probability, when a measured data request signal is transmitted from a receiver module to a sensor module, or when a frequency of the data request signal is changed, so as to promptly acquire a measured data from the sensor module.

Means for Solving the Task

To this end, a first aspect of the present invention resides in a tire administration system comprising: a sensor module secured to an inner side of a tire mounted on a vehicle, for measuring a tire state quantity and transmitting a measured data to a vehicle body side; and a receiver module secured to the vehicle body side, for transmitting a data request signal at a predetermined period so as to request said measured data to said sensor module, and for receiving the measured data transmitted from said sensor module; wherein said receiver module is configured so as to (i) transmit said data request signal to said sensor module at a frequency used for a latest, successful acquisition of said measured data, (ii) transmit said data request signal to said sensor module if said measured data cannot be acquired, repeatedly until said measured data is acquired, and (iii) transmit said data request signal to said sensor module, if the number of transmission of said data request signal reached a designated number of transmission, at a frequency used for a second latest, successful acquisition of the measured data.

In this instance, it is preferred that said receiver module is configured to transmit said data request signal to said sensor module by (i) designating the frequency with which said latest acquisition of said measured data was successful, as a frequency of a measured data signal, if said data request signal is transmitted with a frequency used for said latest, successful acquisition of the measured data, and (ii) designating the frequency used for said second latest, successful acquisition of said measured data, as the frequency of the measured data signal, if said data request signal is transmitted with a frequency used for said second latest, successful acquisition of the measured data.

A second aspect of the present invention resides in a tire administration system comprising a sensor module secured to an inner side of a tire mounted on a vehicle, for measuring a tire state quantity and transmitting a measured data to a vehicle body side; and a receiver module secured to the vehicle body side, for transmitting a data request signal at a predetermined period so as to request said measured data to said sensor module, and for receiving the measured data transmitted from said sensor module; wherein said receiver module is configured so as to (i) transmit said data request signal to said sensor module at a frequency used for a latest, successful acquisition of said measured data, (ii) transmit said data request signal to said sensor module, if said measured data cannot be acquired, repeatedly until said measured data is acquired, and (iii) transmit said data request signal to said sensor module, if the number of transmission of said data request signal reached a designated number of transmission, at a frequency of one channel among both channels adjacent to a channel of a frequency used for a second latest, successful acquisition of the measured data was successful.

A third aspect of the present invention resides in a tire administration system comprising: a sensor module secured to an inner side of a tire mounted on a vehicle, for measuring a tire state quantity and transmitting a measured data to a vehicle body side; and a receiver module secured to the vehicle body side, for transmitting a data request signal at a predetermined period so as to request said measured data to said sensor module, and for receiving the measured data transmitted from said sensor module; wherein said receiver module is configured so as to (i) transmit said data request signal to said sensor module at a frequency of a channel of a first highest reception probability for the measured data, (ii) transmit said data request signal to said sensor module if said measured data cannot be acquired, repeatedly until said measured data is acquired, and (iii) transmit said data request signal to said sensor module, if the number of transmission of said data request signal reached a designated number of transmission, at a frequency of a channel of a second highest reception probability for the measured data.

EFFECTS OF THE INVENTION

With the tire administration system according to the present invention, the receiver module transmits the data request signal to the sensor module by selecting a frequency with a high reception probability, transmits the data request signal if the measured data cannot be acquired, repeatedly until the measured data is acquired, and transmits the data request signal, if the number of transmission of the data request signal reached a designated number of transmission and the data request signal has thus to be transmitted to the sensor module with a different frequency, by selecting a frequency with as higher reception probability as possible. In this way, it is possible to promptly acquire the measured data from the sensor module.

BEST MODE FOR CARRYING OUT THE INVENTION

Figure 1:
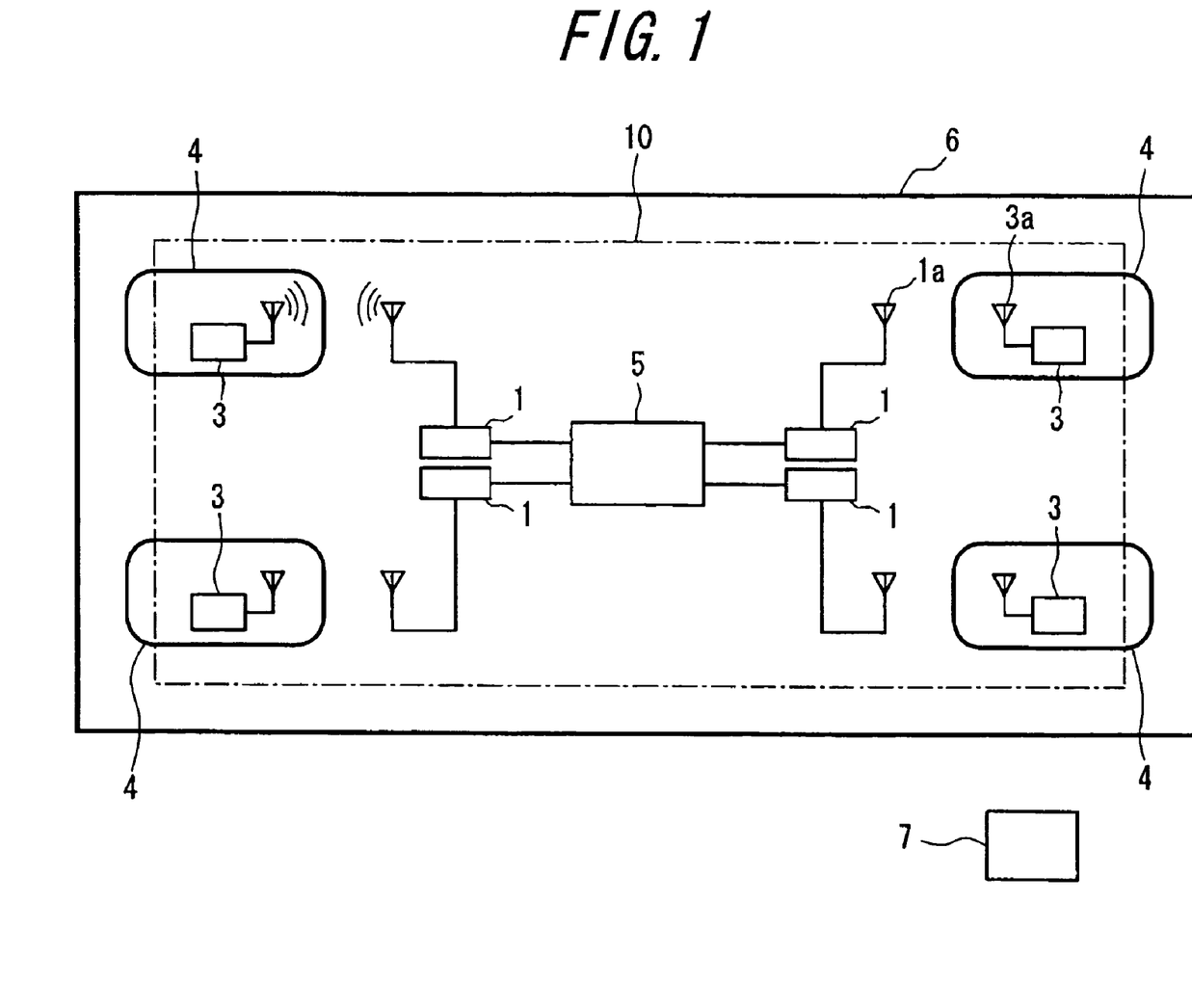
FIG. 1 is a view schematically showing the arrangement of the tire administration system according to the present invention.

The present invention will be described below with reference to the embodiments shown in the accompanying drawings. FIG. 1 schematically shows the arrangement of the tire administration system according to the present invention. The tire administration system 10 is comprised of a sensor module 3 secured to an inner side of a tire 4 that is mounted on a vehicle 6, for measuring a tire state quantity, a receiver module 1 provided for a vehicle body side, for transmitting a data request signal at a predetermined period so as to request the measured data to the sensor module 3, and acquiring the measured data transmitted from the sensor module 3, and a central control module 5 providing command to the receiver module 1 to acquire data from the sensor module 3.

The sensor module 3 is secured to the inner surface of the tire 4 by baking, in order that it is prevented from separation from the tire or breakage even when the tire undergoes deformation in its running state under a loaded condition. Furthermore, the sensor module 3 is comprised of a detector means for detecting tire inner pressure or the like, an antenna 3a and a transmitter for the transmission and reception to or from the receiver module 1, and a controller means for controlling these elements. The detector means may include a detector for detecting the tire temperature besides the tire inner pressure. Incidentally, the sensor module 3 may be secured to a road wheel within the tire interior space, or may be held within the tire interior space by a separate holder means.

The receiver module 1 is comprised of an antenna 1a for receiving a wireless signal from the sensor module 3 including a measured data of the temperature or pressure, and acquires the measured data of the temperature or pressure from the antenna 1a. The receiver module 1 may be arranged inside of the central control module 5. The central control module 5 performs a wireless transmission of the measured data obtained by the receiver module 1 to a vehicle operation administration center 7, which receives the signal from the central control module 5 to monitor the running state of the tires.

Figure 2:
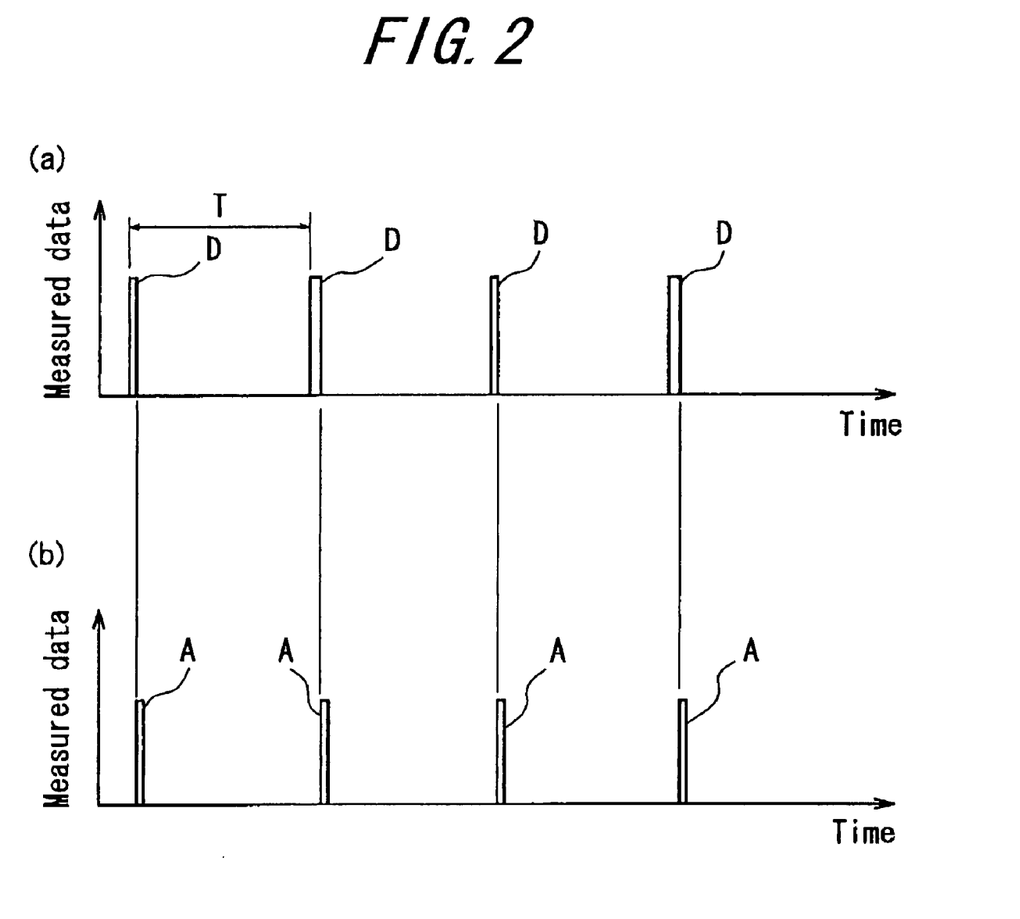
FIGS. 2(a) and 2(b) are timing charts showing an example of signal output from the sensor module and the receiver module.

FIG. 2(a) is a timing chart of the data request signal transmitted by the sensor module 3 to the receiver module 1. The data request signal D is transmitted to the sensor module 3 at a predetermined period T, and the transmission of the data request signal is repeated at a time interval of the period T.

FIG. 2(b) is a timing chart of the measured data transmitted from the sensor module 3 to the receiver module 1. Upon detection of the data request signal D transmitted from the receiver module at the time interval of the period T, the sensor module 3 measures the tire state quantity such as tire inner pressure, and transmits the measured data signal A as the measurement result to the receiver module 1, via the antennas 1a and 3a.

Figure 3:
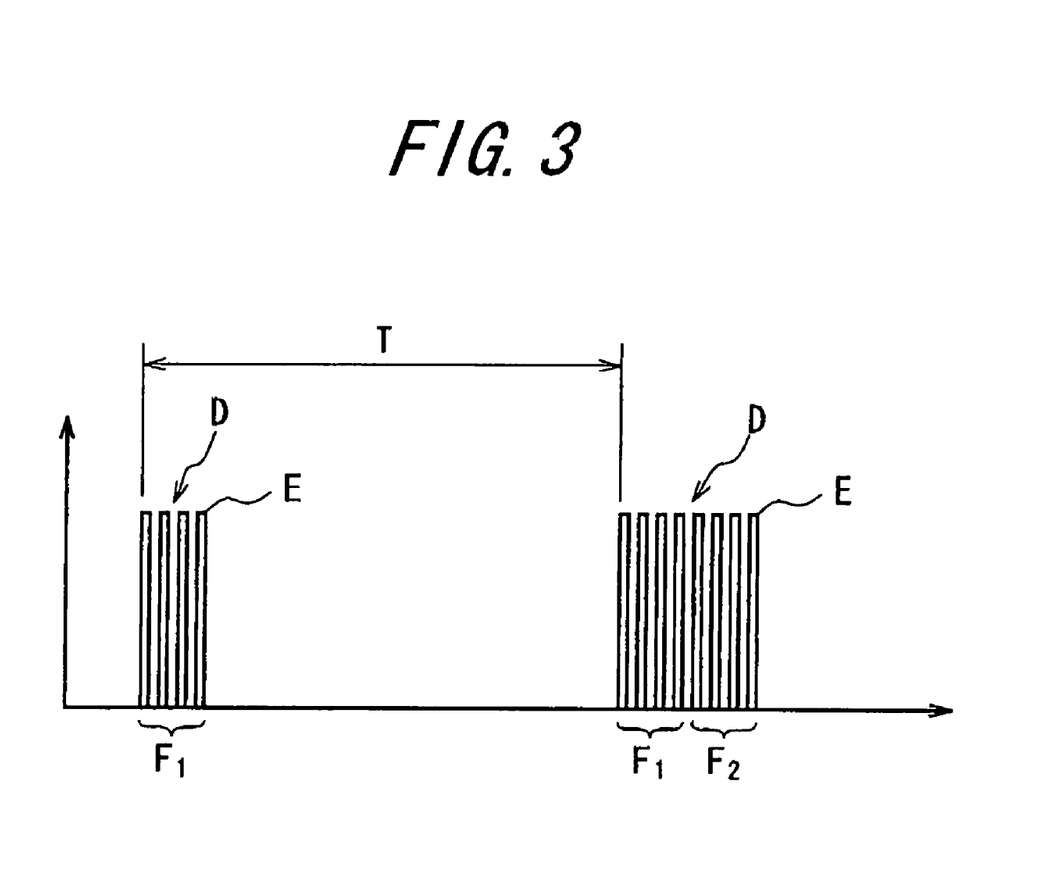
FIG. 3 is a timing chart showing the data request signal in enlarged scale.

As shown in FIG. 3, which is a timing chart of the data request signal in enlarged scale, the data request signal D transmitted by the receiver module 1 is comprised of a plurality of data request signals E that are transmitted at a predetermined period. If there is no data transmission from the sensor module within a predetermined time, in response to the data request signal E transmitted at a frequency $F_1$, the receiver module 1 transmits the data request signal E again and wait for the data transmission from the sensor module 3. Furthermore, if there is no data transmission from the sensor module 3, even after repeated transmission of the data request signal E until a designated number m of transmission (m=4, in FIG. 3) designated for the data request signal E has been reached, the receiver module 1 transmits the data request signal E at a different frequency $F_2$ and wait for the data transmission from the sensor module 3. The transmission of the data request signal E is stopped once the data transmission from the sensor module 3 has been confirmed. Accordingly, the number of data request signals E changes depending upon the presence or absence of the data transmission from the sensor module 3.

Figure 4:
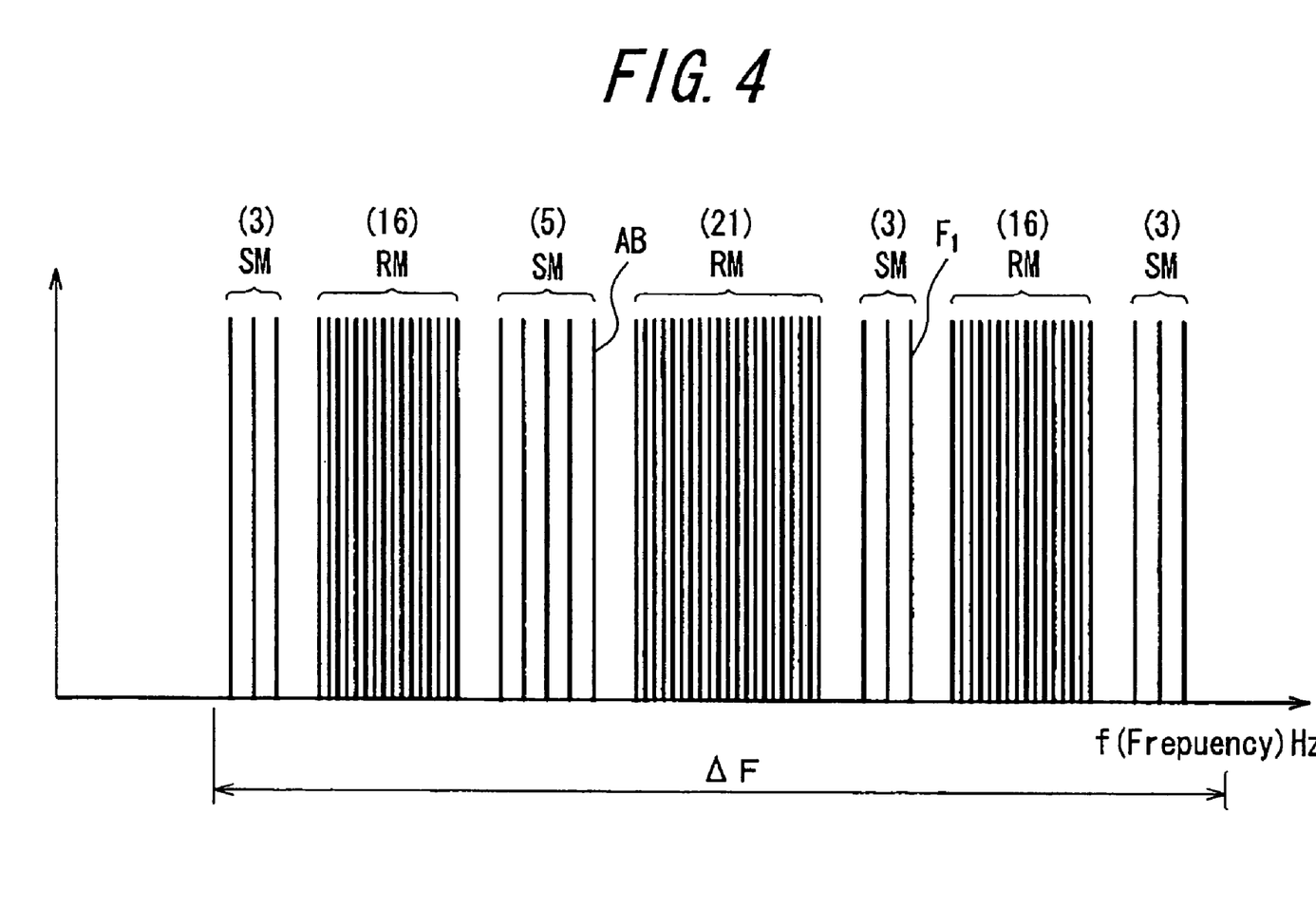
FIG. 4 is a conceptual view showing the frequency ranges as used for data transmission by the receiver module and the sensor module, respectively.

FIG. 4 is a conceptual view showing the frequency ranges as used for data transmission by the receiver module 1 and the sensor module 3, respectively, wherein the abscissa represents the frequency. The frequency ranges as used by the receiver module I and the sensor module 3 for transmission are determined by dividing the predetermined frequency range ΔF as shown, so that they do not overlap with each other. In the illustrated embodiment, fifty three (53) channels indicated by RM are assigned to the transmission of the data request signal from the receiver module 1 to the sensor module 3, and fourteen (14) channels are assigned to the transmission of the measured data from the sensor module 3 to the receiver module 1.

The identification code of the channel as used by the sensor module 3 for the transmission of the measured data is transmitted to the sensor module 3 as a part of the data request signal to be transmitted by the receiver module 1. Upon receipt of this signal, the sensor module 3 transmits the measured data signal by using the frequency of the channel designated therein.

Figure 5:
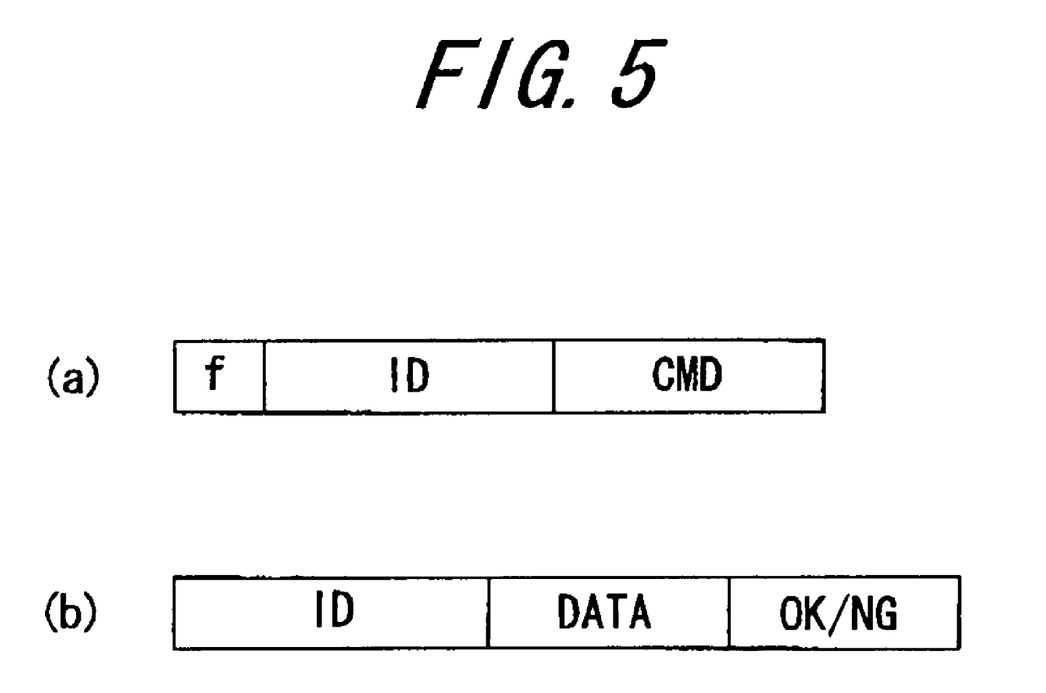
FIGS. 5(a) and 5(b) are conceptual views showing the structure of the data transmitted by the receiver module and the sensor module, respectively.

FIG. 5(a) shows the data structure of the data request signal that is transmitted by the receiver module. Besides a command CMD and an autoidentification code ID of the sensor module 3 to which the transmission is to be effected, the data request signal is comprised of an identification code f identifying the channel to be used by the sensor module 3 for the transmission of the measured data signal, as mentioned above. On the other hand, FIG. 5(b) shows the structure of the measured data signal transmitted by the sensor module. The measured data signal is comprised of a measured data DATA, abnormal flag OK/NG and an identification code ID of the sensor module 3 that performs the transmission.

Figure 6:
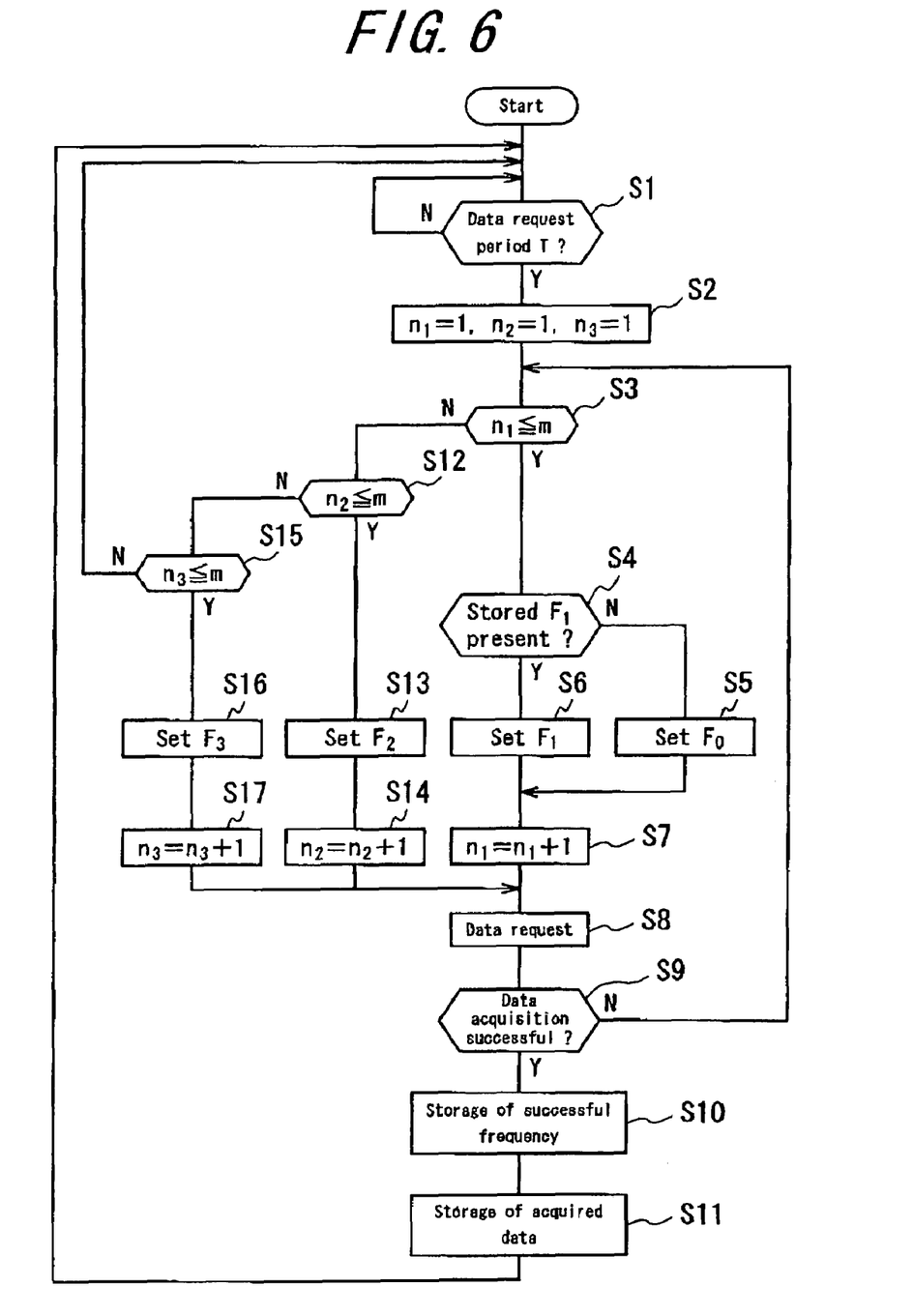
FIG. 6 is a flow chart showing the data processing of the receiver module.

In the next place, the operation of the receiver module will be explained in detail. FIG. 6 is a flow chart showing the data processing of the receiver module 1, wherein $F_0$, $F_1$, $F_2$ and $F_3$ denote the frequencies of the data request signals transmitted from the receiver module 1 to the sensor module 3.

In step S1, the receiver module 3 judges whether the time of the period T has elapsed from the latest transmission of the data request signal to the sensor module 1. If the time of the period T has not elapsed, then step S1 is repeated until the period T has elapsed. Once the period T has elapsed, counters $n_1$, $n_2$, and $n_3$ for counting the number of transmission of the data request signals at frequencies $F_1$ ($F_0$), $F_2$ and $F_3$ are set to 1, respectively (step S2).

In next step S3, it is judged as to whether or not the counter $n_1$ is m or less, wherein m is a designated number of transmission as designated for the data request signal. In this instance, since the counter $n_1$ has been set to 1 and is thus not more than m, it is judged in step S4 as to whether or not there is a stored data of the frequency F1 of the data request signal, with which the latest measured data acquisition has been successful. If there is no such stored data, then the frequency of the data request signal is set to the frequency $F_0$ according to the initial setting (step S5). However, if there is a stored data, then the frequency of the data request signal is set to the stored frequency $F_1$ (step S6).

Subsequently, in step S7, the counter n1 representing the number of transmission of the data request signal is increased by 1. In next step S8, the receiver module 1 designates the channel according to the initial setting, as the channel to be used for the transmission of the measured data signal, if the frequency of the data request signal has been set to $F_0$ in step S5, and then transmits the data request signal at the frequency $F_0$ to the sensor module 3, and designates the channel used for the latest successful measured data acquisition, as the channel to be used for the transmission of the measured data signal, if the frequency of the data request signal has been set to $F_1$ in step S6, and then transmits the data request signal at the frequency $F_1$ to the sensor module 3.

In next step S9, it is judged as to whether or not the receiver module 1 has successfully acquired the measured data from the sensor module 3. If the measured data acquisition has been successful, then the frequency data of the frequency F1 of the data request signal and the data of the identification code of the channel to be used by the sensor module for the transmission of the measured data signal are stored (step S10), the measured data acquired from the sensor module 3 is stored (step S11), and the processing is then returned to step S1.

In step S9, if the measured data acquisition has been unsuccessful, then the processing is returned to step S3, where it is judged as to whether or not the counter $n_1$ is m or less. If the counter $n_1$ is m or less, then the frequency of the data request signal is set to the frequency $F_1$ (F0) (steps S4, S5 and S6), and the counter $n_1$ is increased by 1 (step S7) and the data request signal is transmitted to the sensor module 3 at the frequency $F_1$ (F0).

In step S9, if the measured data acquisition has been unsuccessful again, then the processing is returned to step S3, where it is judged as to whether or not the counter $n_1$ is m or less. If the receiver module 1 repeats failure in acquiring the measured data from the sensor module 3, and the counter $n_1$ representing the number of transmission of the data request signal exceeds the designated number of transmission m of the data request signal, then the processing proceeds to step S12, where it is judged as to whether or not he counter $n_2$ is m or less. In this instance, since the counter $n_2$ has been set to 1 and is thus not more than m, if, for example, the frequencies of the data request signal as used for the previous successful acquisition of the measured data are stored as archival record, then the frequency of the data request signal is set to frequency F2 which has been used for a second latest, successful acquisition of the measured data (step S13).

In next step S14, the counter $n_2$ representing the number of transmission of the data request signal is increased by 1. In step S8, the receiver module 1 designates a channel that has been used for a second latest, successful acquisition of the measured data, as the channel to be used by the sensor module 3 for the transmission of the measured data, and transmits the data request signal at the frequency of $F_2$. In step S9, if the acquisition of the measured data from the sensor module 3 is still unsuccessful, the processing is returned to step S3. In this instance, since the counter $n_1$ is larger than m, the processing proceeds to step S12, where it is judged as to whether or not the counter $n_2$ is m or less. If the counter $n_2$ is m or less, then the frequency of the data request signal is set to $F_2$ once again (step S13), the counter $n_2$ is increased by 1 (step S14), and the data request signal is transmitted to the sensor module 3 at the frequency of $F_2$. (step S8).

In step S9, if acquisition of the measured data from the sensor module 3 is still unsuccessful, the processing is returned to step S3. In this instance, since the counter $n_2$ is larger than m, the processing proceeds to step S12, where it is judged as to whether or not the counter $n_2$ is m or less. If the receiver module 1 still fails to acquire the measured data from the sensor module 1, and the counter $n_2$ representing the number of transmission of the data request signal is larger than the designated number of transmission for the data request signal, then the processing proceeds to step S15, where it is judged as to whether or not the counter $n_3$ is m or less. In this instance, since the counter $n_3$ has been set in step S2 to 1 and is thus not more than m, if, for example, the frequencies of the data request signal as used for the previous successful acquisition of the measured data are stored as archival record, then the frequency of the data request signal is set to frequency F2 which has been used for a third latest, successful acquisition of the measured data (step S16).

In next step S17, the counter $n_3$ representing the number of transmission of the data request signal is increased by 1. In step S8, the receiver module 1 designates the identification code of a channel that has been used for a third latest, successful acquisition of the measured data, as the channel to be used by the sensor module 3 for the transmission of the measured data, and transmits the data request signal at the frequency of $F_3$.

In step S9, if the acquisition of the measured data from the sensor module 3 is still unsuccessful, the processing is returned to step S3. In this instance, since the counter $n_1$ is larger than m, the processing proceeds to step S12. Here, since the counter $n_2$ is larger than m, the processing proceeds to step S15, where it is judged as to whether or not the counter $n_3$ is m or less. If the counter $n_3$ is m or less, then the frequency of the data request signal is set to $F_3$ (step S16), the counter $n_3$ is increased by 1 (step S17), and the data request signal is transmitted to the sensor module 3 at the frequency of $F_3$. (step S8).

In step S9, if the acquisition of the measured data from the sensor module 3 is still unsuccessful, the processing is returned to step S3. In this instance, since the counter $n_1$ is larger than m, the processing proceeds to step S12. Here, since the counter $n_2$ is larger than m, the processing proceeds to step S15, where it is judged as to whether or not the counter $n_3$ is m or less. If the receiver module 1 repeats failure to acquire the measure data from the sensor module 3, and the counter $n_3$ representing the number of transmission of the data request signal is larger than the designated number m of transmission for the data request signal, then the processing is returned to step S1.

In the above-described embodiment, when the receiver module 1 fails to acquire the measured data, the data request signal is transmitted to the sensor module m times for each of the different frequencies $F_1$ ($F_0$), $F_2$ and $F_3$, before a continuous transmission of the data request signal is stopped. However, the continuous transmission of the data request signal may be continued by changing the frequency for each m times further transmission. Alternatively, the continuous transmission of the data request signal may be continued by returning to the initial frequency $F_1$ ($F_0$) and sequentially to $F_2$ and F3.

In the above-described embodiment, furthermore, the frequency used for the latest, successful acquisition of the data signal is used as the frequency $F_1$ of the data request signal, the frequency used for the second latest, successful acquisition of the data signal is used as the frequency $F_2$, and the frequency used for the third latest, successful acquisition of the data signal is used as the frequency $F_3$. However, it is also possible to use the frequency used for the latest, successful acquisition of the data signal as the frequency $F_1$, use the frequency of a channel having a high probability of the data signal acquisition, i.e., one channel among both channels adjacent to a channel of a frequency used for the latest, successful acquisition of the measured data as the frequency $F_2$, and use the frequency of a channel having a high probability of the data signal acquisition, i.e., another channel among both channels adjacent to a channel of a frequency used for the latest, successful acquisition of the measured data as the frequency $F_3$. In this instance, the receiver module 1 designates, as the channel to be used by the sensor module 3 for transmitting the measured data, the same channel as that designated for transmitting the data request signal at the frequency $F_0$ or $F_1$, and transmits the data request signal at the frequency $F_2$ or $F_3$.

Further, it is also possible to derive the measured data acquisition probability for each of the fifty three (53) channels as shown in FIG. 4, which have been assigned for the transmission of the data request signal from the receiver module 1 to the sensor module 3, and use the frequency of the channel with the highest reception probability as the frequency $F_1$, the frequency of the channel with the second highest reception probability as the frequency $F_2$, and the frequency of the channel with the third highest reception probability as the frequency $F_3$.

It will be appreciated from the foregoing description that, with the tire administration system according to the present invention, the receiver module transmits the data request signal to the sensor module by selecting a frequency with a high reception probability, transmits the data request signal if the measured data cannot be acquired, repeatedly until the measured data is acquired, and transmits the data request signal, if the number of transmission of the data request signal reached a designated number of transmission and the data request signal has thus to be transmitted to the sensor module with a different frequency, by selecting a frequency with as higher reception probability as possible. In this way, it is possible to promptly acquire the measured data from the sensor module.

INDUSTRIAL APPLICABILITY

The present invention is applicable to a system for performing a real-time measurement of the tire state information of not only construction vehicle tires, but also of all types of tires including passenger car tires.

The invention claimed is:

1. A tire administration system comprising:
a sensor module secured to an inner side of a tire mounted on a vehicle, for measuring a tire state quantity and transmitting a measured data to a vehicle body side; and
a receiver module secured to the vehicle body side, for transmitting a data request signal at a predetermined period so as to request said measured data to said sensor module, and for receiving the measured data transmitted from said sensor module;
wherein said receiver module is configured so as to (i) transmit said data request signal to said sensor module at a frequency used for a latest, successful acquisition of said measured data, (ii) transmit said data request signal to said sensor module if said measured data cannot be acquired, repeatedly until said measured data is acquired, and (iii) transmit said data request signal to said sensor module, if the number of transmission of said data request signal reached a designated number of transmission, at a frequency used for a second latest, successful acquisition of the measured data.

2. The tire administration system according to claim 1, wherein said receiver module is configured to transmit said data request signal to said sensor module by (i) designating the frequency with which said latest acquisition of said measured data was successful, as a frequency of a measured data signal, if said data request signal is transmitted with a frequency used for said latest, successful acquisition of the measured data, and (ii) designating the frequency used for said second latest, successful acquisition of said measured data, as the frequency of the measured data signal, if said data request signal is transmitted with a frequency used for said second latest, successful acquisition of the measured data.

3. A tire administration system comprising:
a sensor module secured to an inner side of a tire mounted on a vehicle, for measuring a tire state quantity and transmitting a measured data to a vehicle body side; and a receiver module secured to the vehicle body side, for transmitting a data request signal at a predetermined period so as to request said measured data to said sensor module, and for receiving the measured data transmitted from said sensor module;

wherein said receiver module is configured so as to (i) transmit said data request signal to said sensor module at a frequency used for a latest, successful acquisition of said measured data, (ii) transmit said data request signal to said sensor module, if said measured data cannot be acquired, repeatedly until said measured data is acquired, and (iii) transmit said data request signal to said sensor module, if the number of transmission of said data request signal reached a designated number of transmission, at a frequency of one channel among both channels adjacent to a channel of a frequency used for said latest, successful acquisition of the measured data.

4. A tire administration system comprising:

a sensor module secured to an inner side of a tire mounted on a vehicle, for measuring a tire state quantity and transmitting a measured data to a vehicle body side; and a receiver module secured to the vehicle body side, for transmitting a data request signal at a predetermined period so as to request said measured data to said sensor module, and for receiving the measured data transmitted from said sensor module;

wherein said receiver module is configured so as to (i) transmit said data request signal to said sensor module at a frequency of a channel of a first highest reception probability for the measured data, (ii) transmit said data request signal to said sensor module if said measured data cannot be acquired, repeatedly until said measured data is acquired, and (iii) transmit said data request signal to said sensor module, if the number of transmission of said data request signal reached a designated number of transmission, at a frequency of a channel of a second highest reception probability for the measured data.

* * * * *